United States Patent
Kottilingam et al.

(10) Patent No.: US 10,480,332 B2
(45) Date of Patent: Nov. 19, 2019

(54) ROTORS AND METHODS OF MAKING THE SAME

(71) Applicant: General Electric Company, Schenectady, NY (US)

(72) Inventors: Srikanth Chandrudu Kottilingam, Greenville, SC (US); Kenneth B. Potter, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 98 days.

(21) Appl. No.: 15/491,114

(22) Filed: Apr. 19, 2017

(65) Prior Publication Data

US 2017/0218780 A1    Aug. 3, 2017

Related U.S. Application Data

(63) Continuation-in-part of application No. 14/565,732, filed on Dec. 10, 2014.

(51) Int. Cl.
| | | |
|---|---|---|
| *F01D 5/28* | (2006.01) | |
| *F01D 5/06* | (2006.01) | |
| *B23P 15/06* | (2006.01) | |

(52) U.S. Cl.
CPC .............. *F01D 5/288* (2013.01); *B23P 15/06* (2013.01); *F01D 5/06* (2013.01); *F05D 2220/30* (2013.01); *F05D 2230/236* (2013.01); *F05D 2230/239* (2013.01); *F05D 2300/17* (2013.01); *Y10T 29/4932* (2015.01); *Y10T 29/49316* (2015.01); *Y10T 29/49321* (2015.01); *Y10T 29/49323* (2015.01)

(58) Field of Classification Search
CPC . B23K 2101/001; B23K 35/004; F01D 5/063; B23P 15/06; Y10T 29/4932; Y10T 29/49316; Y10T 29/49321; Y10T 29/49323
See application file for complete search history.

(56) References Cited

U.S. PATENT DOCUMENTS

| | | | |
|---|---|---|---|
| 2,369,051 A | 2/1945 | Huber | |
| 3,876,335 A * | 4/1975 | Forcinal | B23K 33/00 416/198 R |
| 3,967,919 A * | 7/1976 | Coulon | B23K 9/232 416/198 A |

(Continued)

OTHER PUBLICATIONS

Fu et al., "Microstructural characterization of a diffusion-bonded joint for 9Cr-ODS and JLF-1 reduced activation ferritic/martensitic steels", Fusion Engineering and Design, ScienceDirect, Fusion Engineering and Design 89, Apr. 5, 2014, pp. 1658-1663.

(Continued)

*Primary Examiner* — Jason L Vaughan
(74) *Attorney, Agent, or Firm* — Dority & Manning, P.A.

(57) ABSTRACT

A method of joining a first work piece and a second workpiece. The first and second workpieces may be rotor wheels of a rotor for a turbomachine. At least one of the workpieces includes an oxide dispersion strengthened alloy material and the first and second work pieces may be joined by welding a cladding on at least one of the workpieces to the other of the workpieces, without welding a substrate of the at least one workpiece which includes an oxide dispersion strengthened alloy material.

12 Claims, 6 Drawing Sheets

(56) References Cited

U.S. PATENT DOCUMENTS

| | | | | |
|---|---|---|---|---|
| 4,086,690 | A | * | 5/1978 | Bernasconi .......... B23K 9/0282 29/889.2 |
| 4,504,554 | A | * | 3/1985 | Yoshioka .............. F01D 5/06 428/683 |
| 4,606,778 | A | * | 8/1986 | Jahnke ................ B23K 20/16 148/527 |
| 4,679,314 | A | | 7/1987 | Lenz et al. |
| 4,962,586 | A | | 1/1990 | Clark et al. |
| 5,009,359 | A | | 4/1991 | Stover et al. |
| 5,129,784 | A | | 7/1992 | Yoshikawa et al. |
| 5,383,985 | A | * | 1/1995 | Coulon ............... B23K 20/021 148/527 |
| 5,431,752 | A | * | 7/1995 | Brogle ................ B23K 20/129 148/516 |
| 5,510,080 | A | | 4/1996 | Nishi et al. |
| 6,129,257 | A | | 10/2000 | Xu et al. |
| 6,152,697 | A | * | 11/2000 | Konishi ............... B23P 15/006 416/213 R |
| 6,767,649 | B2 | * | 7/2004 | Staubli ................ B22F 7/08 428/553 |
| 7,156,282 | B1 | * | 1/2007 | Renaud ............... B23K 1/0018 228/122.1 |
| 7,179,342 | B2 | * | 2/2007 | Scarlin ................ B23K 31/12 148/530 |
| 7,314,670 | B2 | * | 1/2008 | Bartsch ................ B23K 9/042 428/610 |
| 7,655,879 | B2 | | 2/2010 | Witte et al. |
| 7,682,471 | B2 | | 3/2010 | Levin |
| 8,220,697 | B2 | * | 7/2012 | Kottilingam ......... B23K 26/356 228/203 |
| 8,414,267 | B2 | * | 4/2013 | Ganesh ................ B21J 5/002 416/213 R |
| 8,597,438 | B2 | | 12/2013 | Chandrasekaran et al. |
| 8,616,851 | B2 | | 12/2013 | DiDomizio et al. |
| 8,961,144 | B2 | * | 2/2015 | Ganesh ................ F01D 5/063 416/244 A |
| 2002/0172587 | A1 | * | 11/2002 | Keller ................. B23K 9/0026 415/1 |
| 2005/0106407 | A1 | * | 5/2005 | Scarlin ................ B23K 31/12 428/615 |
| 2006/0086708 | A1 | * | 4/2006 | Coleman .............. B23K 35/004 219/137 WM |
| 2008/0141616 | A1 | | 6/2008 | Ohngren |
| 2016/0312653 | A1 | | 10/2016 | DiDomizio et al. |

OTHER PUBLICATIONS

Hammelmann et al.,"Diffusion welding of ODS alloys using HIP-techniques", Materials Science, IAEA INIS, vol. 22, Issue-09, Sep. 1990, Abstract only, 1 Page.

Khan et al.,"Transient liquid phase diffusion bonding and associated recrystallization phenomenon when joining ODS ferritic superalloys", Journal of Materials Science, Springer Link, vol. 31, Issue 11, Jun. 1996, Abstract only, 1 Page.

Kurta et al.,"Diffusion bonding between Ti—6Al—4V alloy and ferritic stainless steel", Materials Letters, ScienceDirect, vol. 61, Issues 8-9, Apr. 2007, pp. 1747-1750.

Miao et al., "Thermal stability of nano-structured ferritic alloy", Science Direct, Journal of Nuclear Materials, vol. 377, 2008, pp. 59-64.

* cited by examiner

ROTORS AND METHODS OF MAKING THE SAME

RELATED APPLICATIONS

This application is a continuation-in-part of and claims priority to U.S. patent application Ser. No. 14/565,732 filed on Dec. 10, 2014, which is incorporated herein by reference in its entirety for all purposes.

FIELD

The present subject matter relates generally to methods of joining and, more particularly, to methods of joining rotor wheels for turbomachines.

BACKGROUND

Turbomachines are widely utilized in fields such as power generation. For example, a conventional gas turbine system includes a compressor section, a combustor section, and at least one turbine section. The compressor section is configured to compress air as the air flows through the compressor section. The air is then flowed from the compressor section to the combustor section, where it is mixed with fuel and combusted, generating a hot gas flow. The hot gas flow is provided to the turbine section, which utilizes the hot gas flow by extracting energy from it to power the compressor, an electrical generator, and other various loads.

A typical compressor for a gas turbine may be configured as a multi-stage axial compressor and may include both rotating and stationary components. A shaft drives a central rotor, which has a number of annular rotors, e.g., rotor wheels. Rotor stages of the compressor rotate between a similar number of stationary stator stages, with each rotor stage including a plurality of rotor blades secured to a rotor wheel and each stator stage including a plurality of stator vanes secured to an outer casing of the compressor. The rotor wheels of the several stages may be joined together, such as with axially oriented fasteners, e.g., bolts. During operation, airflow passes through the compressor stages and is sequentially compressed, with each succeeding downstream stage increasing the pressure until the air is discharged from the compressor outlet at a maximum pressure.

The hot gas flow provided to the turbine section impinges on a plurality of rotor blades, sometimes referred to as "buckets," causing them to rotate. The rotor blades are typically annularly arranged around a rotor wheel which is mounted on a shaft, such that the hot gas flow to the turbine section impinging on the rotor blades will cause the wheel to rotate, which in turn causes the shaft to rotate. The rotation of the shaft may be used to, e.g., power the compressor or electrical generator, etc., as mentioned above. A typical turbine section includes a plurality of stages, e.g., three stages, axially spaced along the shaft. Each stage generally includes a rotor wheel with a plurality of rotor blades thereon, and the rotor wheels of the several stages may be joined together, such as with axially oriented fasteners, e.g., bolts.

Oxide dispersion strengthened alloys possess advantageous properties which may be useful in various components of a turbomachine, e.g., rotor wheels. For example, oxide dispersion strengthened alloys of nickel may have high-temperature creep strength which may be useful in hot gas path components of a turbine, e.g., turbine rotor wheels. As another example, oxide dispersion strengthened alloys of steel may be advantageous in components such as the rotor wheel of the compressor. The advantageous properties of oxide dispersion strengthened alloys derive at least in part from the grain structure of the matrix material and the dispersion of very small oxide particles within the matrix material. As a result, oxide dispersion strengthened alloys are not suitable for many welding processes. For example, fusion welding processes may alter the structure and/or distribution of the oxide particles which can have a deleterious effect on the advantageous properties of the oxide dispersion strengthened alloys.

BRIEF DESCRIPTION

Aspects and advantages of the invention will be set forth in part in the following description, or may be obvious from the description, or may be learned through practice of the invention.

In accordance with a first embodiment, a method of making a rotor for a turbomachine is provided. The method includes forming a first rotor wheel comprising a first material. The first rotor wheel defines a radius length along a radial direction. The method further includes applying a cladding on a downstream face of the first rotor wheel. The cladding comprises a second material distinct from the first material. The cladding defines a width extending along the radial direction. The width of the cladding is less than the radius length of the first rotor wheel. The method also includes joining the first rotor wheel to a second rotor wheel by welding the cladding to a portion of an upstream face of the second rotor wheel without welding the first rotor wheel.

In another exemplary embodiment, a rotor is provided. The rotor includes a first stage rotor wheel with a plurality of first stage rotor blades annularly arranged about the periphery of the first stage rotor wheel. The first stage rotor wheel comprises an oxide dispersion strengthened alloy material. The rotor also includes a second stage rotor wheel downstream of the first stage rotor wheel. A plurality of second stage rotor blades are annularly arranged about the periphery of the second stage rotor wheel. The rotor further includes a cladding on a downstream side of the first stage rotor wheel. The cladding includes a weldable material distinct from the oxide dispersion strengthened alloy of the first stage rotor wheel. The cladding is joined to the second stage rotor wheel at an upstream side of the second stage rotor wheel. The oxide dispersion strengthened alloy includes an alloy matrix having nanofeatures dispersed within the alloy matrix, and the alloy matrix has a uniform grain size.

In another exemplary embodiment, a method of joining is provided. The method includes forming a first workpiece. The first workpiece includes a substrate and a cladding. Forming the first workpiece includes forming a substrate of the first workpiece and applying a cladding to a portion of a surface of the substrate. The substrate includes a first material. The substrate defines a radius length along a radial direction. The cladding includes a second material distinct from the first material. The cladding defines a width extending along the radial direction. The width of the cladding is less than the radius length of the substrate. The method further includes joining the first workpiece to a second workpiece by welding the cladding to a portion of a surface of the second workpiece without welding the substrate.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION

Figure 1:
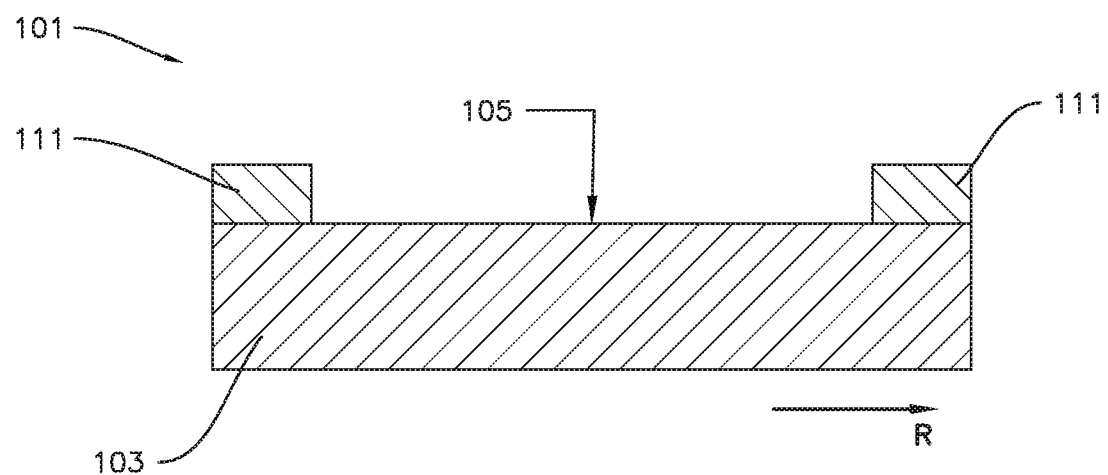
FIG. 1 provides a section view of a workpiece according to embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components. The terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents. Although exemplary embodiments of the present disclosure will be described generally in the context of a land based power generating gas turbine for purposes of illustration, one of ordinary skill in the art will readily appreciate that embodiments of the present disclosure may be applied to any style or type of turbomachine and are not limited to land based power generating gas turbines unless specifically recited in the claims.

Referring now to the drawings, FIG. 1 illustrates a first workpiece 101 according to various embodiments of the present disclosure. As shown, the first workpiece 101 includes a first substrate 103 and a first cladding 111. The first substrate 103 defines a radius length, the radius length extends along a radial direction R. In some embodiments, first cladding 111 may be contiguous, e.g., around the periphery of the substrate 103. In other embodiments, the first cladding 111 may be intermittent. In general, the first cladding 111 extends over only a portion of a surface 105 of first substrate 103 to which the first cladding 111 is applied. For example, as illustrated in FIG. 1, the first cladding 111 defines a width extending along the radial direction R, and the width of the first cladding 111 is less than the radius length of the first substrate 103. The first substrate 103 comprises a first material and the first cladding 111 comprises a second material distinct from the first material.

In some exemplary embodiments, the first material may be an oxide dispersion strengthened alloy. In some example embodiments, the oxide dispersion strengthened alloy may be an oxide dispersion strengthened alloy of nickel. In other example embodiments, the oxide dispersion strengthened alloy may be an oxide dispersion strengthened alloy of steel, some oxide dispersion strengthened alloys of steel may also referred to as nanostructured ferritic alloys (NFA). Further, the first material, e.g., oxide dispersion strengthened alloy, may be homogenous and uniform throughout the first workpiece 101. An oxide dispersion strengthened alloy generally includes an alloy matrix with nanofeatures dispersed within the matrix. The matrix material may be, e.g., nickel, steel, platinum, or other suitable metal material based on the desired end use of the oxide dispersion strengthened alloy. The alloy matrix may have a very high density of nanofeatures therein, such as about one quintillion nanofeatures per cubic meter ($10^{18}$ $m^{-3}$) or greater, such as about one hundred quintillion nanofeatures per cubic meter ($10^{20}$ $m^{-3}$), and in some certain instances, at least about ten sextillion nanofeatures per cubic meter ($10^{22}$ $m^{-3}$). For example, the nanofeatures may include clusters of an oxide having largest dimension, e.g., an outer diameter, on the order of one to ten nanometers (1 nm to 10 nm), such as about twenty nanometers (20 nm) or less. The nanofeatures may have any shape, including, for example, spherical, cuboidal, lenticular, and other shapes. In example oxide dispersion strengthened alloys, the matrix may be a steel alloy including Nickel, Chromium, and/or other suitable constituents to provide desired characteristics, such as high strength, heat resistance, and/or creep resistance. In some examples, the oxide dispersion strengthened alloy may include oxides such as Yttrium Oxide, e.g., $Y_2O_3$, or Yttrium Titanium Oxide, e.g., $Yi_2TiO_5$ or $Yi_2Ti_2O_7$. In particular examples where the oxide dispersion strengthened alloy is an NFA, the oxide nanofeatures may include titanium oxide (Ti—O) and at least one other metal element from an oxide used to prepare the NFA or the alloy matrix. For example, yttrium oxide, aluminum oxide, zirconium oxide, hafnium oxide may be used to prepare the NFAs, in which case, the nanofeatures may comprise yttrium (Y), aluminum (Al), zirconium (Zr), hafnium (Hf) or combinations of these, in addition to the aforementioned titanium. Other metals, such as iron (Fe), chromium (Cr), molybdenum (Mo), tungsten (W), manganese (Mn), silicon (Si), niobium (Nb), aluminum (Al), nickel (Ni), or tantalum (Ta) from the steel alloy matrix may also participate in the creation of the nanofeatures.

The oxide dispersion strengthened alloy may include an ultrafine grain structure and full density. The ultrafine grains of the matrix in an oxide dispersion strengthened alloy material may be deformed during typical joining processes. For example, fusion welding a workpiece comprising an oxide dispersion strengthened alloy material may result in coarsening of the grains, as well as dissolving, melting and/or coagulating the oxide features because of the heat generated by the fusion welding process. Further, the heat of the welding process may result in thermally induced porosity, an increase the size of voids in the oxide dispersion strengthened alloy material. In another example, friction stir welding may deform the grains of the alloy matrix and/or disrupt the distribution of oxide features within the matrix. Accordingly, embodiments of the present disclosure permit a first workpiece 101 comprising an oxide dispersion strengthened alloy material to be joined to a second workpiece 201 without welding the oxide dispersion strengthened alloy, e.g., such that the oxide dispersion strengthened alloy in the finished product retains the physical characteristics, such as grain size and oxide nanofeature distribution, which provide advantageous properties of the oxide dispersion strengthened alloy, such as high-temperature creep strength in an oxide dispersion strengthened alloy of nickel.

The fine grain structure of the first material, and in particular the alloy matrix thereof, may have a uniform grain size. The oxide dispersion strengthened alloy may have a full density, e.g., the porosity may be less than about one percent (1%). For example, the first material may be an oxide dispersion strengthened alloy with a porosity of about one half percent (0.5%) in an as-extruded state. Such exemplary oxide dispersion strengthened alloys may experience an increased porosity as a result of fusion welding, which may be as much as six percent (6%) or more. According to the present disclosure, a workpiece 101, and in particular a substrate 103 of the workpiece 101, may comprise an oxide dispersion strengthened alloy and may be joined to a second workpiece 201 without welding the substrate 103, e.g., such that the oxide dispersion strengthened alloy of the substrate 103 in the finished product has a porosity of about one and a half percent (1.5%) or less, such as about one percent (1%) or less, such as about one half percent (0.5%). It should be appreciated that as used herein, terms of approximation, such as "about" or "approximately," refer to being within ten percent above or below a stated value. For example, about 1.5% may include from 1.35% to 1.65%.

The oxide dispersion strengthened alloy may include oxides which are dispersed within, rather than aligned with, the alloy matrix. Since the oxides are dispersed within the alloy matrix, dislocations of the lattice of the matrix material can only overcome the oxides by climb, thus, the oxide dispersion strengthened alloy has a higher threshold stress than the alloy matrix material would have without the dispersed oxide nanofeatures. However, welding the oxide dispersion strengthened alloy, such as by fusion welding or friction stir welding, may result in deformation of the oxide dispersion strengthened alloy which alters the distribution of the oxide nanofeatures within the alloy matrix. According to the present disclosure, a workpiece 101, and in particular a substrate 103 of the workpiece 101, may comprise an oxide dispersion strengthened alloy and may be joined to a second workpiece 201 without welding the substrate 103, e.g., such that the oxide dispersion strengthened alloy of the substrate 103 in the finished product has oxide nanofeatures dispersed within the alloy matrix.

The average outer diameter of the oxide nanofeatures of the oxide dispersion strengthened alloy in an as-extruded state may be between about one and a half nanometers (1.5 nm) and about two and a half nanometers (2.5 nm), such as about two and one tenth nanometers (2.1 nm). However, exposure to heat, such as during a fusion welding process, may result in coarsening of the oxide nanofeatures, resulting in nanofeatures having an average outer diameter between about two and two tenths nanometers (2.2 nm) and about four nanometers (4 nm). According to the present disclosure, a workpiece 101, and in particular a substrate 103 of the workpiece 101, may comprise an oxide dispersion strengthened alloy and may be joined to a second workpiece 201 without welding the substrate 103, e.g., such that the nanofeatures of the oxide dispersion strengthened alloy material may have an outer diameter of between about one and a half nanometers (1.5 nm) and about two and a half nanometers (2.5 nm).

The first cladding 111 may comprise the second material and the second material may be any suitable material which is compatible with the first material and which is weldable. For example, a suitable second material may be compatible with the first material in that it is similar with respect to properties which may be life-limiting within the use environment of the workpiece 101, such as corrosion resistance and coefficient of thermal expansion. In some exemplary embodiments, e.g., where the first material is an oxide dispersion strengthened alloy of nickel, the workpiece 101 may be a hot gas path component of a gas turbine, such as a rotor wheel for a turbine section. In such embodiments, the use environment of the workpiece 101 (in this example, the hot gas path of a gas turbine) includes high temperatures to which the workpiece 101 may be exposed, such that a suitable second material compatible with the first material would include materials with a similar coefficient of thermal expansion as the first material. Also for example, the second material may be a weldable material, e.g., may include any suitable material for welding, and in particular for fusion welding. For example, a material may be considered suitable for welding and "weldable" when joining the material to another work piece by fusion welding may create a heat-affected zone in the weldable material without causing a substantial loss in the useful properties of the material, such as the strength of the material. In some embodiments, the first material may be an oxide dispersion strengthened alloy and the second material may be X12CrMoWVNbN, also known as Cost E, an alloy developed by the European Cooperation in Science and Technology (COST).

The first cladding 111 may be applied to the surface of the workpiece 101 by any suitable method, e.g., which does not result in altering the grain structure of the first material sufficient to reduce the strength of the first material, in contrast to, e.g., fusion welding. For example, the cladding 111 may be applied to the substrate 103 by solid state joining a layer of the second material to the surface 103 of the first workpiece 101. Examples of suitable methods of solid state joining include but are not limited to roll bonding, explosion bonding, friction surface cladding, or any other suitable method.

Figure 2:
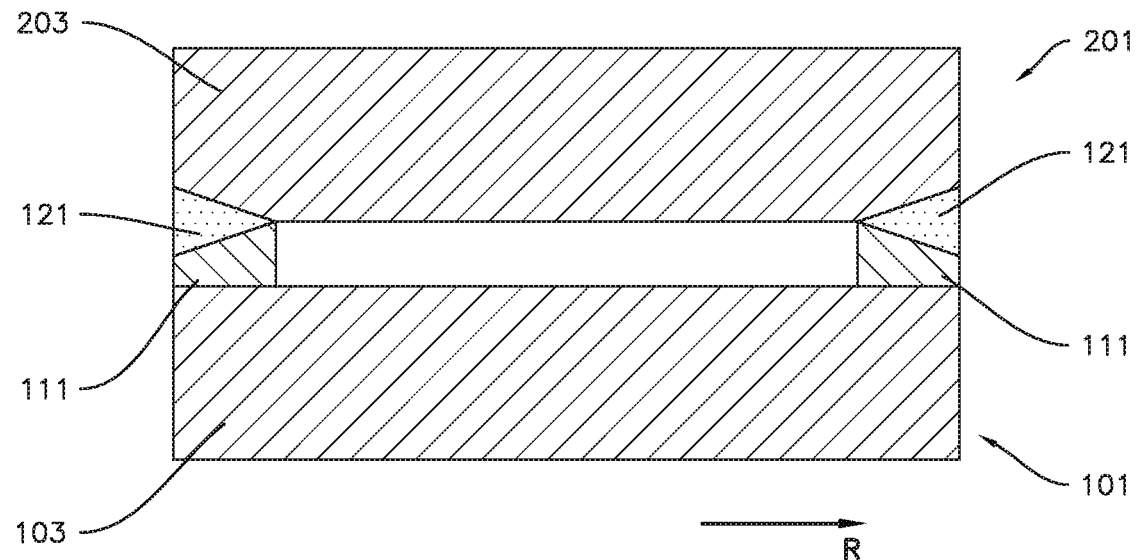
FIG. 2 provides a section view of the workpiece of FIG. 1 joined to a second workpiece according to embodiments of the present disclosure.
Figure 3:
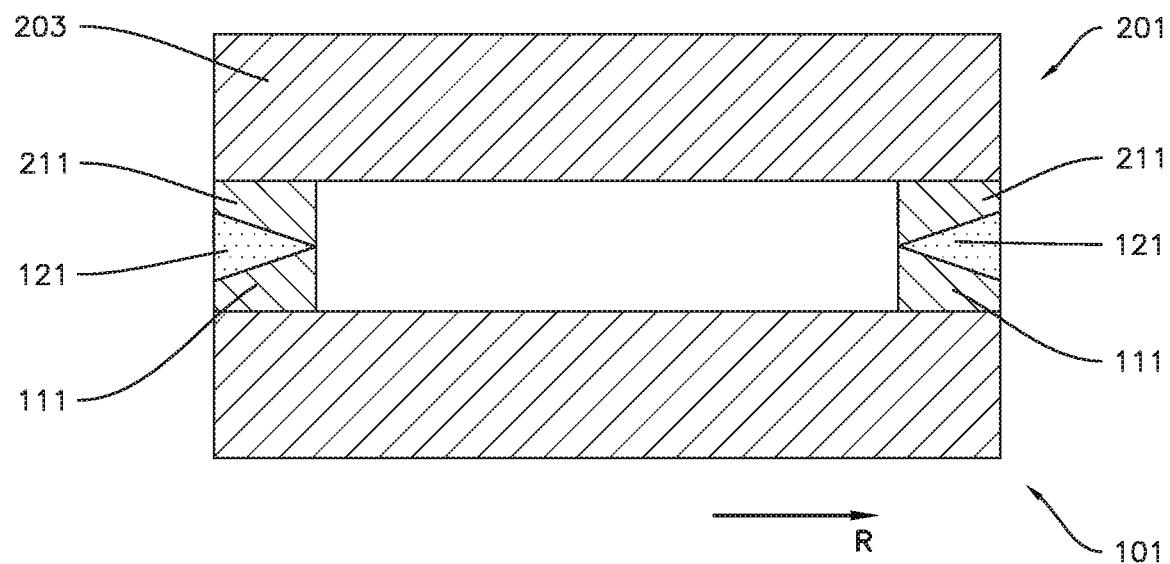
FIG. 3 provides a section view of the workpiece of FIG. 1 joined to a second workpiece according to further embodiments of the present disclosure.

As shown in FIGS. 2 and 3, the first workpiece 101 may be joined to a second workpiece 201. In some embodiments, the first workpiece 101 may be joined to the second workpiece 201 by welding the first cladding 111 to a portion of a surface of the second workpiece 201 without welding the substrate 103. For example, a weld seam 121 may be created as a result of welding the first cladding 111 to the second workpiece 201, and the material within the weld seam 121 may be deformed as a result of the welding process. In some embodiments, for example when the first cladding 111 is fusion welded to the second workpiece 201, the weld seam may include a heat affected zone, e.g., an area of the welded material wherein the grain structure is deformed due to the heat from the fusion welding process. The first cladding 111 may be fusion welded to the second workpiece 201 without fusion welding the substrate 103, e.g., without creating a heat affected zone in the substrate 103 and any heat affected zone 121 which may be created would not extend beyond the first cladding 111 into the first substrate 103. In other example embodiments, the first cladding 111 may be welded to the second workpiece 201 by friction stir welding, such that the weld seam 121 may include an area within the welded material wherein the grains of the welded material have been mechanically deformed by passage of a friction stir weld tool through the welded material, e.g., the first cladding 111 and either the second substrate 203 or the second cladding 211. In such embodiments, the first cladding 111 may be welded to the second workpiece 201 without welding the substrate 103, e.g., without mechanically deforming the material, e.g., oxide dispersion strengthened alloy, of the substrate 103 during welding of the first cladding 111 to the second workpiece 201.

In some embodiments, e.g., as illustrated in FIG. 2, the second workpiece 201 may comprise any suitable material and the first cladding 111 may be welded directly to the portion of the surface of the second workpiece 201.

In other embodiments, e.g., as illustrated in FIG. 3, the second workpiece 201 may comprise a second substrate 203 with a second cladding 211 applied to the portion of the surface of the second workpiece 201. In such embodiments, the first workpiece 101 and the second workpiece 201 may be joined by welding the first cladding 111 to the second cladding 211 without welding the first substrate 103 and without welding the second substrate 203. Accordingly, the structure and other physical characteristics of the first material, e.g., oxide dispersion strengthened alloy, in the second substrate 203 may be similar to those described herein with respect to oxide dispersion strengthened alloy material in the first substrate 103.

Some embodiments may include a method of joining the first workpiece 101 and the second workpiece 201. An example embodiment of such a method of joining may include forming the first workpiece, where the first workpiece includes first substrate 103 and first cladding 111. Such example method may also include forming the first workpiece 101 by forming the substrate 103 of the first material, e.g., an oxide dispersion strengthened alloy, and applying the cladding 110 to a portion of a surface 105 of the first workpiece 101. As discussed above, the cladding 111 may be applied by solid state joining the second material to the substrate 103. The example embodiment of the method for joining may further include joining the first workpiece 101 to the second workpiece 201 by welding the first cladding 111 to a portion of a surface 205 of the second workpiece 201 without welding the first substrate 103. In some embodiments, the first cladding 111 may be welded directly to the portion of surface 205 of the second workpiece 201, whereas other embodiments may further include second cladding 211 on the second workpiece 201. In the latter example, a method of joining may include applying second cladding 210 to the portion of the surface 205 of the second workpiece 201, and joining the first workpiece 101 to the second workpiece 201 may include welding the first cladding 111 to the second cladding 211 without welding the first substrate 103 and without welding the second substrate 203.

In some embodiments, the method of joining the first workpiece 101 and the second workpiece 201 may include making a rotor for a turbomachine, e.g., the first and second workpieces 101 and 201 may be rotor wheels of the rotor, and an example method of making a rotor may include joining the first rotor wheel 100 and the second rotor wheel 200, as well as forming and applying steps as described above with respect to workpieces 101, 201 in general. Additional details of example embodiments wherein the workpieces 100 and 200 are embodied as rotor wheels are provided below.

Figure 4:
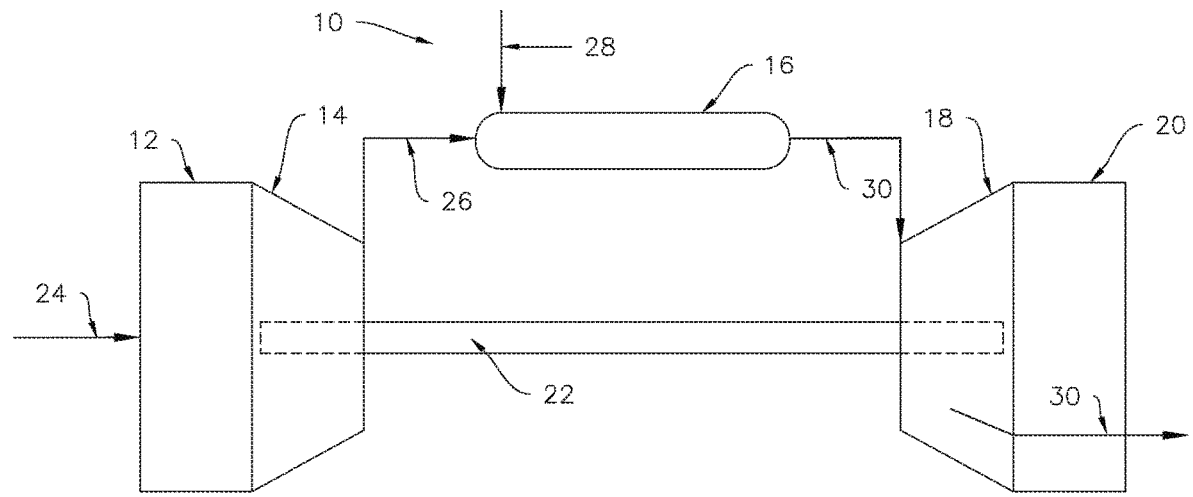
FIG. 4 provides a schematic illustration of a gas turbine which may include embodiments of the present disclosure.

Referring now to FIG. 4, a schematic diagram of an exemplary gas turbine 10 that may incorporate various embodiments of the present disclosure is illustrated. As shown, the gas turbine 10 generally includes an inlet section 12, a compressor 14 disposed downstream of the inlet section 12, at least one combustor 16 disposed downstream of the compressor 14, a turbine 18 disposed downstream of the combustor 16 and an exhaust section 20 disposed downstream of the turbine 18. Additionally, the gas turbine 10 may include one or more shafts 22 that couple the compressor 14 to the turbine 18.

During operation, air 24 flows through the inlet section 12 and into the compressor 14 where the air 24 is progressively compressed, thus providing compressed air 26 to the combustor 16. At least a portion of the compressed air 26 is mixed with a fuel 28 within the combustor 16 and burned to produce combustion gases 30. The combustion gases 30 flow from the combustor 16 into the turbine 18, wherein energy (kinetic and/or thermal) is transferred from the combustion gases 30 to rotor blades, thus causing shaft 22 to rotate. The mechanical rotational energy may then be used for various purposes such as to power the compressor 14 and/or to generate electricity. The combustion gases 30 exiting the turbine 18 may then be exhausted from the gas turbine 10 via the exhaust section 20.

Figure 5:
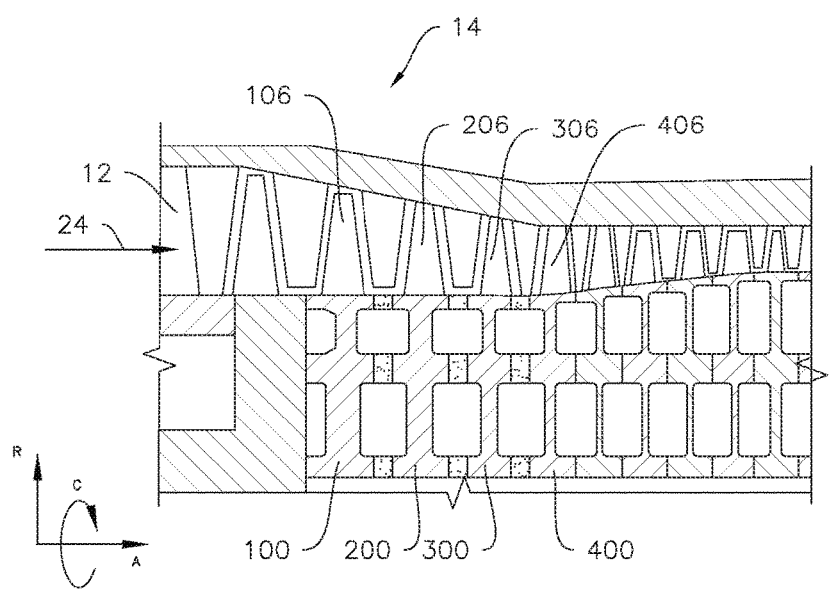
FIG. 5 provides a partial section view of a gas turbine which may include embodiments of the present disclosure.
Figure 6:
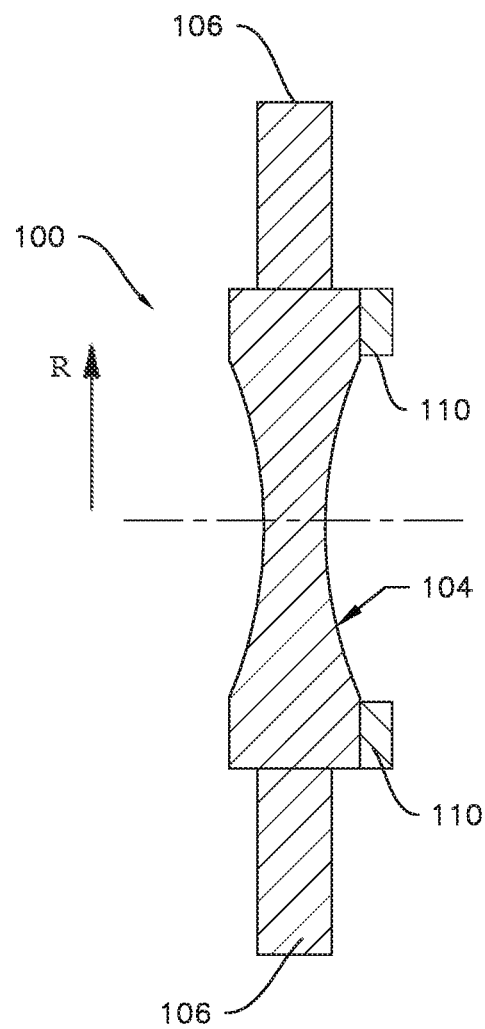
FIG. 6 provides a section view of a first stage rotor wheel according to embodiments of the present disclosure.
Figure 7:
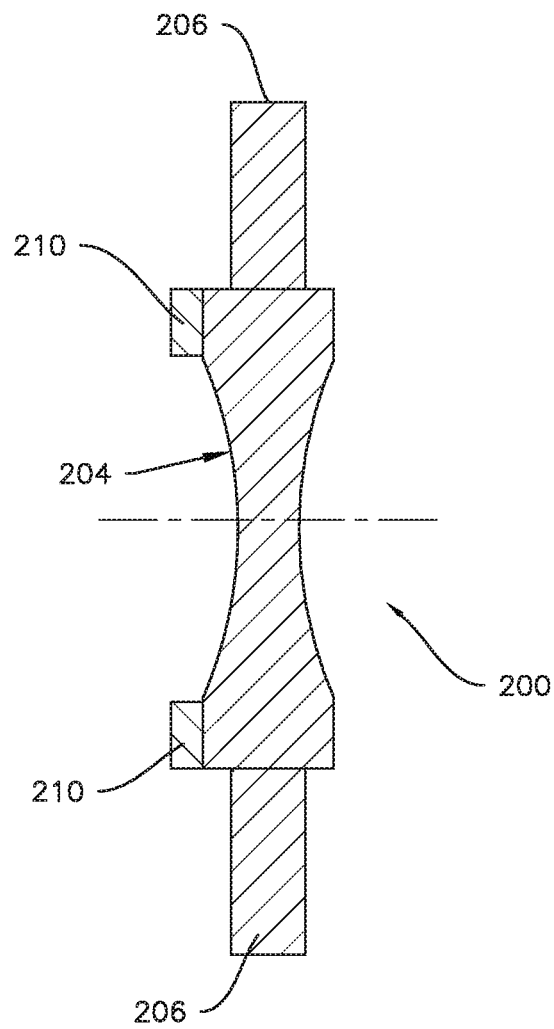
FIG. 7 provides a section view of a second stage rotor wheel according to embodiments of the present disclosure.
Figure 8:
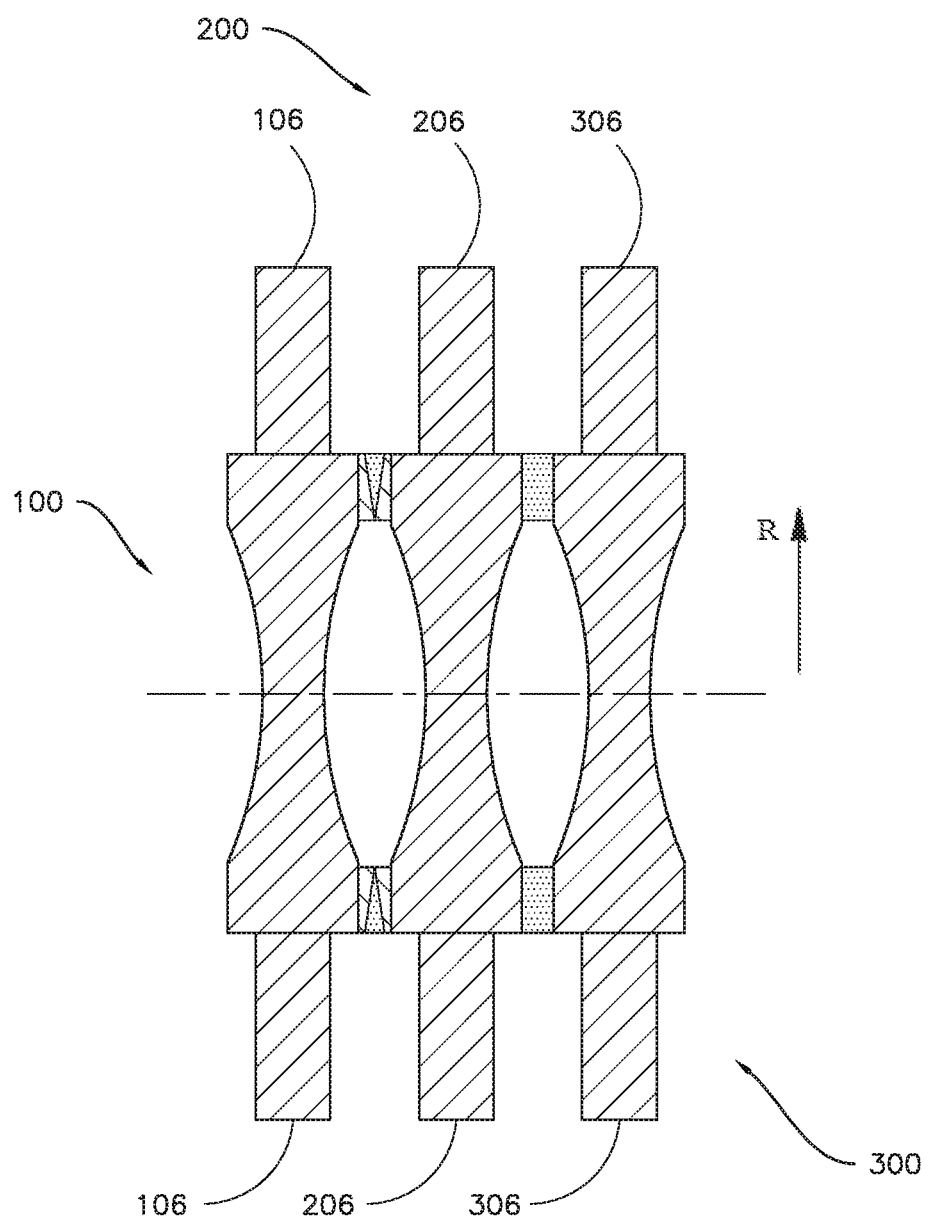
FIG. 8 provides a section view of a rotor including the first stage rotor wheel of FIG. 6 and the second stage rotor wheel of FIG. 7.

FIG. 5 illustrates a section through a portion of a gas turbine 10, such as the gas turbine 10 schematically depicted in FIG. 4. As noted in FIG. 5, the gas turbine 10 may define an axial direction A, a radial direction R perpendicular to the axial direction A, and a circumferential direction C which extends around the axial direction A. In particular, FIG. 5 illustrates an inlet 12 and a portion of compressor section 14 of gas turbine 10. The compressor section 14 may include a rotor comprising a plurality of rotor wheels 100, 200, 300, 400. Each of the rotor wheels 100, 200, 300, 400 has a plurality of rotor blades 106, 206, 306, and 406, respectively, annularly arranged around a periphery of the respective rotor wheel 100, 200, 300, 400. One or more of the rotor wheels 100, 200, 300, 400 may include an oxide dispersion strengthened alloy material. In such embodiments, the rotor wheels may comprise workpieces as described herein, and more particularly one or more of the rotor wheel(s) 100, 200, 300, 400 may include a main body 102 or 202 which embody the substrate 103 or 203 of a workpiece 101 or 201. Thus, such embodiments may include one or more claddings, e.g., a first rotor wheel cladding 110 and a second rotor wheel cladding 210 as shown in FIGS. 6-8. For example, as shown in FIG. 6, the first rotor wheel 100 may be a first stage rotor wheel, and may include a downstream surface or downstream side 104 of the first stage rotor wheel 100 and a first rotor wheel cladding 110 may be applied to the downstream side 104 of the first stage rotor wheel. Some example embodiments may also include a second stage rotor wheel 200, as illustrated in FIG. 7, which may include an oxide dispersion strengthened alloy material and an upstream surface or upstream side 204 of the second stage rotor wheel 200 and a second rotor wheel cladding 210 applied to the upstream side 204 of the second stage rotor wheel 200. Accordingly, in some embodiments, the first stage rotor wheel 100, and in particular, the first rotor wheel cladding 110 thereon, may be directly joined to the second stage rotor wheel 200, while in other embodiments, the first rotor wheel cladding 110 may be joined to the second rotor wheel cladding 210.

An exemplary rotor is illustrated in FIG. 8 which includes a first rotor wheel 100, embodied as a first stage rotor wheel positioned at an upstream end (e.g., as may be seen generally in FIG. 5) of the rotor, the first stage rotor wheel 100 comprising an oxide dispersion strengthened alloy material with a first rotor wheel cladding 110 thereon, and a second rotor wheel 200, embodied as second stage rotor wheel 200, also comprising an oxide dispersion strengthened alloy material and with a second rotor wheel cladding 210 thereon, wherein the first rotor wheel cladding 110 is welded to the second rotor wheel cladding 210. Accordingly the first rotor wheel cladding 110 may be welded to the second rotor wheel cladding 210 without welding the first stage rotor wheel 100 and without welding the second stage rotor wheel 200, as described hereinabove. Further, the rotor may comprise one or more additional stages and additional rotor wheels, such as a third stage rotor wheel 300. The third stage rotor wheel 300 may comprises any suitable material, including but not necessarily an oxide dispersion strengthened alloy material, and may be joined to the second stage rotor wheel 200 by any suitable method. In the example illustrated in FIG. 8, the third stage rotor wheel 300 may be directly joined to the second stage rotor wheel 200. However, it is also possible to provide a similar joining between the third stage rotor wheel 300 and the second stage rotor wheel 200 as the joining between the second stage rotor wheel 200 and the first stage rotor wheel 100, e.g., a third cladding may be provided on a downstream face of the second stage rotor wheel 200, and the third cladding may be joined directly to the third stage rotor wheel 300 or may be joined to a fourth cladding on an upstream face of the third stage rotor wheel 300. It is understood that further variations and combinations are possible, for example, more or fewer rotor wheels may be provided, any two of which may be joined as described herein. Further, various combinations are possible up to and including all of the rotor wheels of a rotor may be joined as described herein.

Figure 9:
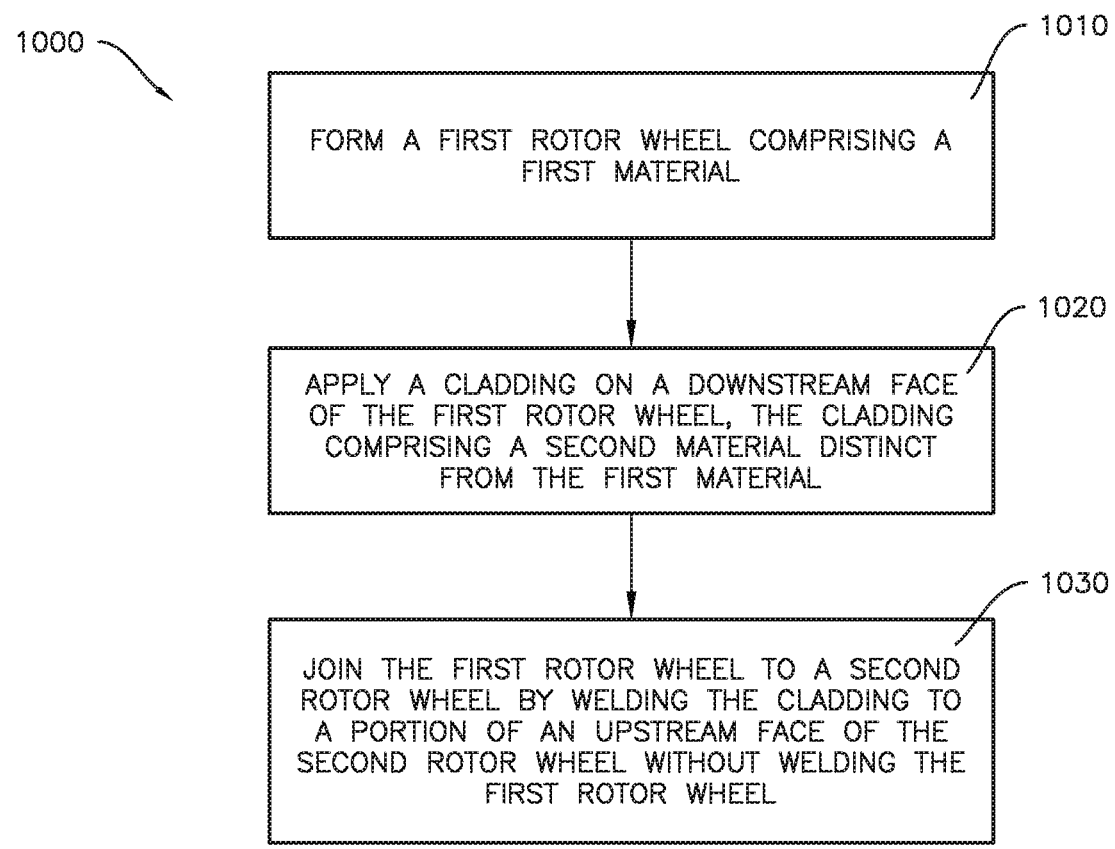
FIG. 9 is a flow chart illustrating a method of forming a rotor in accordance with embodiments of the present disclosure.

As illustrated in FIG. 9, some embodiments may include a method 1000 of making a rotor for a turbomachine. Exemplary rotors include a rotor for a compressor section 14 or a rotor for a turbine section 18. In one possible example, an oxide dispersion strengthened alloy composed primarily of nickel may be advantageous for a rotor for a turbine section 18. The method 1000 may include a step 1010 of forming a first rotor wheel 100 comprising a first material. The first rotor wheel 100 may also define a radius length along a radial direction R. The method 1000 may further include a step 1020 of applying a cladding 110 on a downstream face 104 of the first rotor wheel 100, where the cladding includes a second material which is distinct from the first material. Also, the cladding 110 may define a width extending along the radial direction R, and the width of the cladding 100 may be less than the radius length of the first rotor wheel 100. Method 1000 may further include a step 1030 of joining the first rotor wheel 100 to a second rotor wheel 200 by welding the cladding 110 to a portion of an upstream face 204 of the second rotor wheel 200 without welding the first rotor wheel 100.

As noted above, the terms "first," "second," and "third" may be used interchangeably to distinguish one component from another and are not intended to signify location or importance of the individual components. Thus, for example and without limitation, the first rotor wheel 100 and the second rotor wheel 200 as described herein may in some embodiments be a third stage rotor wheel and a fourth stage rotor wheel, respectively. Accordingly, it should be understood that the first rotor wheel and second rotor wheel may be any stage rotor wheels and more than one set of adjacent rotor wheels in a particular rotor may be joined as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method of making a rotor for a turbomachine, the method comprising:
   forming a first rotor wheel comprising an oxide dispersion strengthened alloy material, the first rotor wheel defining a radius length along a radial direction;
   applying a cladding on a downstream face of the first rotor wheel by solid state joining a layer of a second material distinct from the oxide dispersion strengthened alloy material to the downstream face of the first rotor wheel, the cladding defining a width extending along the radial direction, the width of the cladding is less than the radius length of the first rotor wheel; and
   joining the first rotor wheel to a second rotor wheel by welding the cladding to a portion of an upstream face of the second rotor wheel without welding the first rotor wheel;
   wherein the method does not alter the grain structure of the oxide dispersion strengthened alloy material.

2. The method of claim 1, wherein joining the first rotor wheel to the second rotor wheel comprises fusion welding the cladding to the portion of the upstream face of the second rotor wheel without creating a heat-affected zone in the first rotor wheel.

3. The method of claim 1, wherein joining the first rotor wheel to the second rotor wheel comprises friction stir welding the cladding to the portion of the upstream face of the second rotor wheel without deforming the first rotor wheel.

4. The method of claim 1, wherein the oxide dispersion strengthened alloy material is homogenous and uniform throughout the first rotor wheel.

5. The method of claim 1, wherein the cladding comprises a first cladding, the method further comprising forming the second rotor wheel of the oxide dispersion strengthened alloy material, the second rotor wheel defining a radial length along the radial direction, and applying a second cladding on the upstream face of the second rotor wheel, the second cladding comprising the second material distinct from the oxide dispersion strengthened alloy material, the second cladding defining a width extending along the radial direction, the width of the second cladding less than the radius length of the second rotor wheel, and joining the first rotor wheel to the second rotor wheel comprises welding the first cladding and the second cladding without welding the first rotor wheel and without welding the second rotor wheel.

6. The method of claim 5, wherein joining the first rotor wheel to the second rotor wheel comprises fusion welding the first cladding and the second cladding without creating a heat-affected zone in the first rotor wheel and without creating a heat-affected zone in the second rotor wheel.

7. The method of claim 5, wherein joining the first rotor wheel to the second rotor wheel comprises friction stir welding the first cladding and the second cladding without deforming the first rotor wheel and without deforming the second rotor wheel.

8. The method of claim 1, wherein solid state joining comprises friction surface cladding the layer of the second material to the downstream face of the first rotor wheel.

9. The method of claim 1, wherein solid state joining comprises explosion bonding the layer of the second material to the downstream face of the first rotor wheel.

10. The method of claim 1, wherein the first rotor wheel is a first stage rotor wheel positioned at an upstream end of the rotor.

11. A method of joining, comprising:
forming a first workpiece, the first workpiece comprising a substrate and a cladding, forming the first workpiece comprises:
   forming the substrate of the first workpiece, the substrate comprising an oxide dispersion strengthened alloy material, the substrate defining a radius length along a radial direction; and
   applying the cladding to a portion of a surface of the substrate by solid state joining a layer of a second material distinct from the oxide dispersion strengthened alloy material to a face of the substrate, the cladding defining a width extending along the radial direction, the width of the cladding less than the radius length of the substrate; and
joining the first workpiece to a second workpiece by welding the cladding to a portion of a surface of the second workpiece without welding the substrate;
wherein the method does not alter the grain structure of the oxide dispersion strengthened alloy material.

12. The method of claim 11, wherein the substrate comprises a first substrate, the cladding comprises a first cladding, and the second workpiece comprises a second substrate, the method further comprises applying a second cladding to the portion of the surface of the second workpiece, and joining the first workpiece to the second workpiece comprises welding the first cladding to the second cladding without welding the first substrate and without welding the second substrate.

* * * * *